April 9, 1946.　　　　　O. S. FOWLER　　　　　2,397,955
REEL
Filed May 5, 1943　　　　　2 Sheets-Sheet 1
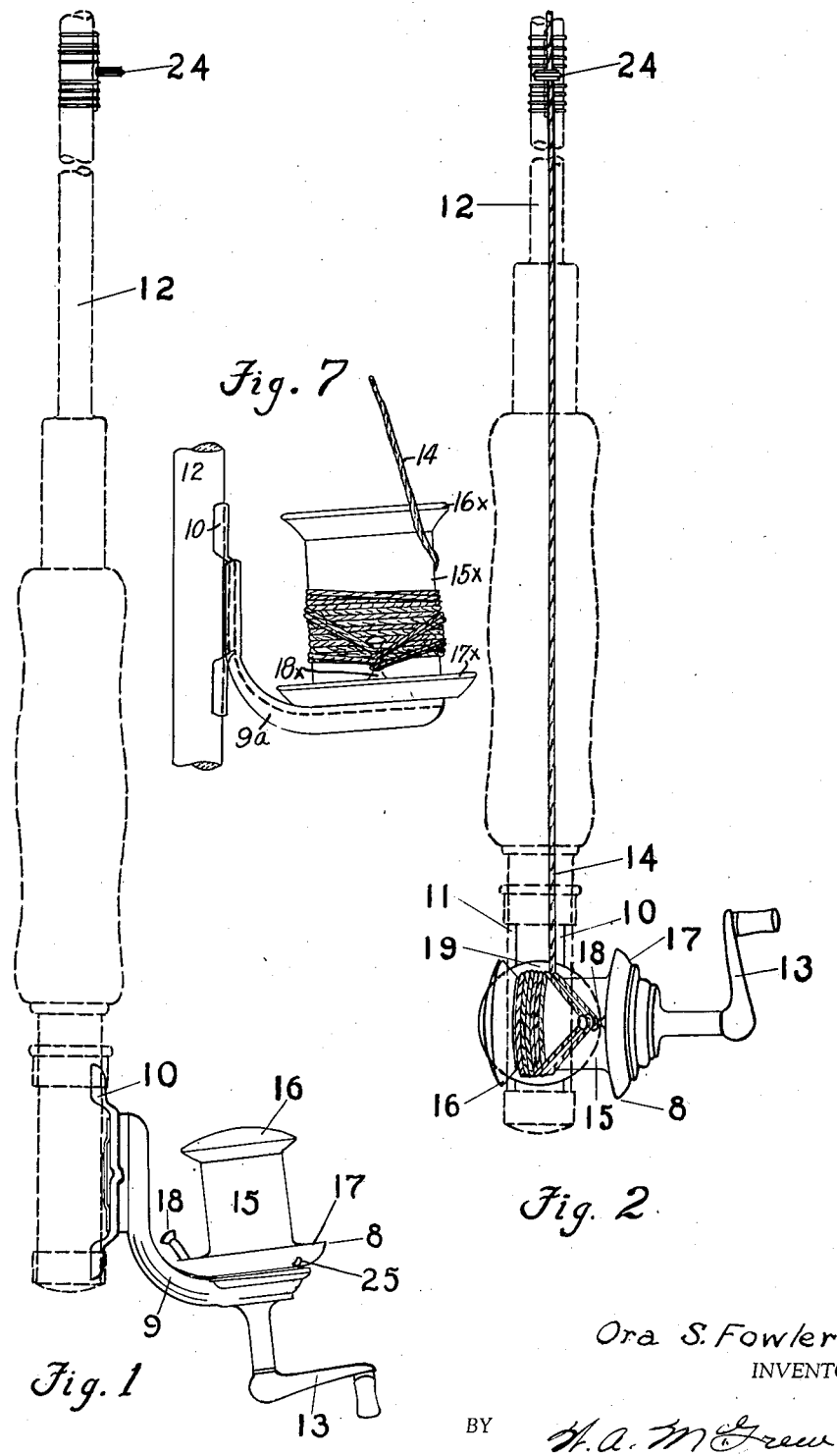
Ora S. Fowler
INVENTOR.
BY　H. A. McGrew
　　　Attorney

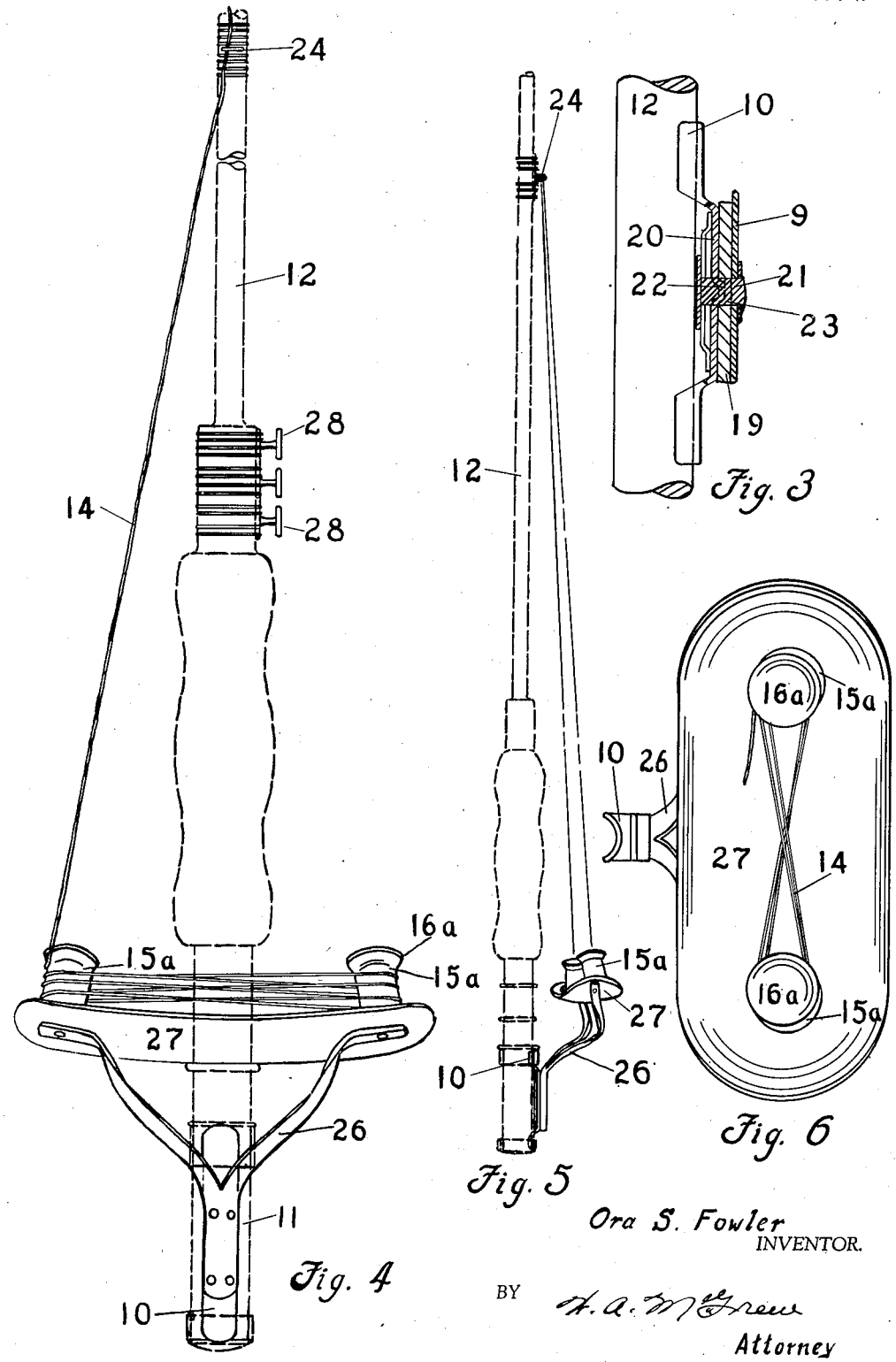

Patented Apr. 9, 1946

2,397,955

UNITED STATES PATENT OFFICE 2,397,955

REEL

Ora S. Fowler, Denver, Colo.

Application May 5, 1943, Serial No. 485,751

16 Claims. (Cl. 43—18)

This invention relates to fishing reels and more particularly relates to casting reels of the type employed in the spinning technique.

In many types of stream and lake fishing, such as trout fishing for example, it frequently is necessary for the fisherman to cast the bait or lure relatively long distances to reach the places where the fish are accustomed to feed. The conventional type reel that is used for this kind of fishing has a considerable amount of frictional resistance to its rotation, and at the beginning of the cast, it is necessary to overcome the inertia of the reel before the line plays out.

Usually the line and bait or lure used in these operations are quite light, and it takes a high degree of skill to make a long cast without damage to the bait or lure, and which will place the bait or lure on the water in a way that will not frighten the fish.

The spinning technique offers an advantage over conventional casting methods for the average fisherman. A spool, either rotary or stationary, is supported from the casting rod with its lengthwise axis parallel to the lengthwise axis of the rod, and in the casting action the line unwinds from the spool in a substantially friction-free movement.

However, the repeated winding and unwinding of the line on the spool induces a twisting or looping of the line which frequently results in snarling. This is a source of considerable annoyance to the fisherman who must spend much of his time on the stream in unsnarling the line. For this reason, the spinning technique has never had much popularity with American sportsmen.

It is an object of the present invention to provide a spinning type casting reel that is designed to permit the user to wind the line first in one direction and then in a reverse direction, as desired, and thereby overcome twisting tendencies which otherwise might occur in the line.

Another object of the invention is to provide a simple, durable and efficient spinning type casting reel that may be used for relatively long periods without snarling the line.

A further object of the invention is to provide a spinning type casting reel that employs a novel type of line-winding arrangement.

Other objects reside in novel details of construction and novel combinations and arrangements of parts, all of which will appear more fully in the course of the following description.

The accompanying drawings illustrate certain typical embodiments of the invention. In the drawings, in the several views of which like parts have been designated similarly, Figure 1 is a side elevation of a reel embodying features of the present invention, with the rod on which it is to be mounted indicated by the dotted line representation;

Figure 2 is a top plan view of the reel shown in Figure 1;

Figure 3 is a fragmentary section, drawn to an enlarged scale, of the pivotal mounting of the reel of Figures 1 and 2;

Figure 4 is a bottom plan view of a modified type of reel embodying features of the present invention, and showing its relation to a casting rod, indicated by the dotted line representation;

Figure 5 is a side elevation of the reel of Figure 4, drawn to a reduced scale, and showing its relation to parts of a rod indicated by the dotted line representation;

Figure 6 is a front elevation of the reel shown in Figure 4; and

Figure 7 is a side elevation of another form of reel embodying features of the present invention.

Referring first to the form of the invention shown in Figures 1, 2 and 3, a reel 8 is journaled for rotation on a bracket 9, pivotally mounted on supporting plate member 10 adapted for mounting on a reel seat 11 of a casting rod 12. The reel in this embodiment of the invention has a handle 13 for winding a line 14.

In this form of the invention, the reel comprises a spool portion 15 having forward and rear flanges 16 and 17 respectively, which are relatively wide. A stud 18 projects at an inclination from the periphery of rear flange 17. In the casting operation, the reel is positioned with the lengthwise axis of spool 15 extending lengthwise of rod 12, and in the line-winding operation the position of the reel is shifted to dispose said lengthwise axis at substantially right angles to the lengthwise axis of rod 12.

To this end, bracket 9 is attached to a disc 19 in register with a circular section 20 of plate 10 (see Figure 3), and the disc 19 is held on section 20 by a spring urged pin 21. Preferably cooperative radial ribs 22 and grooves 23 on the adjoining surfaces of section 20 and disc 19 respectively, hold the latter parts from free rotation about pin 21.

The spring-urged pin 21 serves to clampingly hold the ribs 22 in register with grooves 23 and the reel support is thus held at any setting until the fisherman wishes to move it to a different position. In such a case, laterally-directed forces are applied at the end of the reel mounting to rotate disc 19 on circular section 20. In this action the ribs 22 spring out of grooves 23, compressing the spring of pin 21.

When a new set of grooves 23 is brought into register with ribs 22, the spring-urged pin snaps the ribs into the grooves and again clampingly holds the associated parts together. This position is maintained until the fisherman again swings the reel mounting to its initial position in a reverse movement.

In use, an end of line 14 is attached to spool portion 15 and the line is wound thereon by turning handle 13. The flanged ends 16 and 17 serve to keep the line on the spool portion during such winding. The free end of line 14 is drawn away from reel 8 and strung along the rod 12 through a series of eyelets or guides 24, only one of which has been shown in the drawings.

Suitable bait or lure (not shown) is mounted on the end of line 14 extending beyond the tip of rod 12 and the assembly is then ready for casting. The reel 8 is maintained in the position shown in Figure 1, and preferably the mounting of the reel is so proportioned that the lengthwise axis of spool 15, if extended, would pass directly through the first guide 24 above the handle of rod 12.

The cast is made by flipping the line and rod rearwardly of the fisherman to a substantially horizontal position, then immediately snapping the rod forward to a substantially vertical position and then allowing the resilience of the rod and the momentum of the line and lure to carry to the surface of the water at a distance from the fisherman. In this action the momentum of the line exerted against the windings of the spool portion 15 cause them to assume a centrifugal component that draws the loop portions successively from the spool in a substantially unimpeded movement. In particular, there is no inertia factor at all comparable to that present in conventional reels, for which reason there is no initial drag put on the line to retard the flight of the lure at the end of the line. As a consequence, casts of unusual length are made without undue effort.

When the fisherman desires to retract the line either in playing a fish or for the purpose of making a new cast, the reel mounting is rotated to the position indicated in Figure 2, and line 14 is wound on spool portion 15 by rotation of handle 13. Whenever the operator desires to avoid a repetition of the previous windings, he loops the line adjoining the spool about stud 18, and changes the direction of winding of the line on the spool before resuming the rotation of handle 13 in a reverse direction. In this way, twisting or snarling of the line may be substantially avoided. When the fisherman is ready to make another cast the reel is moved back to its original starting position and the aforesaid operation is repeated.

In the preferred construction of the reel shown in Figures 1 and 2, it will be desirable to have a clicking and braking action incorporated into the rotation of spool 15. This has been indicated more or less diagrammatically by a rib 25 mounted on the exterior of flange portion 17, which is adapted to touch bracket 9 in each revolution of the reel and produces a clicking sound. Usually a pawl and ratchet arrangement is utilized to produce the clicking and braking action and it will be apparent that such a means may be substituted for the rib 25 if desired.

Another form of reel construction embodying the same winding principle has been illustrated in Figures 4, 5 and 6. In this form of the device, a supporting plate 10 is rigidly connected with a yoke member 26 supporting two spools 15a substantially spaced and having their lengthwise axes directed at the first guide 24 of the rod 12 on which the reel is mounted. Note in particular Figure 5 wherein the direction of the axes of the spools has been illustrated by dot and dash lines. The yoke member is so shaped as to dispose the spools 15a at a substantial distance from the rod 12 when the reel is mounted on the rod, so as not to impede the winding of the line 14 about the spools in a manner hereinafter to be described.

Preferably a curved guard plate 27 is supported from yoke 26 at the rear end of spools 15a to serve as a guide in the hand winding operation. As clearly shown in Figure 4, the spools 15a at their forward ends have a wide flange 16a to hold the line against slipping when it is being wound thereon.

With this type of reel, a figure-8 winding is employed as clearly shown in Figure 6, and this form of winding effectively prevents curling of the line material which would result in snarling.

The casting operation is performed in the manner hereinbefore described and the momentum of the line again imparts the centrifugal component to the portions looped about the spools 15a, permitting a rapid paying out of the line without any appreciable drag being placed thereon in the initial movement.

When a fish is hooked it sometimes is necessary to place a considerable amount of drag on the line and this is provided in the present arrangement by mounting a series of studs 28 on the rod 12 adjacent to its handle. As soon as the fish is hooked, a fisherman can wind the line about the studs to provide a drag or snubbing action and in this way too rapid paying out of the line is prevented. While the series of studs 28 is a satisfactory arrangement for this purpose, other snubbing means or drag-imparting means may be substituted in place thereof.

A third form of the invention has been illustrated in Figure 7. In this form a spool member 15x having forward and rearward flanged ends 16x and 17x respectively, is rigidly attached to a bracket member 9a formed integral with or rigidly secured to a base plate 10 adapted for mounting on the reel seat of a rod 12. If desired, a guard plate similar to the guard plate 27 of Figures 4, 5 and 6, may be mounted between the rear flange 17x of spool 15x and bracket 9a.

A hand winding action is employed with this form of reel, which substantially duplicates the mechanical winding action of the form of reel illustrated in Figures 1 and 2. Excessive curling of the line through repetitions of winding is avoided by looping the line about a projection 18x on rear flange 17x, and thereafter winding in a reverse direction as has been clearly indicated in Figure 7. Due to the fact that hand winding is employed, it is unnecessary to rotate the reel mounting as in Figure 1, for which reason the rigid mounting hereinbefore described has been employed.

In using the reel shown in Figure 7 the cast is made in the manner hereinbefore described, and the initial momentum of the line imparts the centrifugal component which readily releases the looped portions from the reel. When a fish is hooked or when the line is to be retracted for a new cast, the operator winds the line about the spool portion 15x with a continuous rotary action. However, when it is desired to reverse the windings to prevent curling, he simply moves the line about stud 18x to loop the same and then employs a reverse winding, also with a continuous rotary motion.

In the form of the device illustrated in Figure 7, the snubbing arrangement illustrated in Figure 4 may be used, or any other type of snubbing or drag-imparting arrangement suitable for the purpose may be substituted in place thereof.

In all the forms illustrated, it will be noted that the operation contemplates at least a modified figure-8 winding, whether it be done by moving the line about a stud on a larger spool, or about two spools as in the form of Figure 4. From a practical standpoint, the studs 18 and 18x function as a second spool to permit the operator to utilize the figure-8 winding or winding similar thereto. In all such actions, duplication of position in winding is avoided in the repetitions of winding and for this reason the curling and snarling tendencies heretofore prevalent with this type of reel have been substantially avoided.

In the form of the invention shown in Figures 1 and 2, it is only necessary to a proper functioning of the device that the rotation about pin 21 should extend through 90°. However, to provide an all-purpose reel that can be used by either right or left handed persons, I prefer to so arrange the pivotal mounting that the reel can be swung through 180°.

In both the forms shown in Figures 1 and 7 the stud or second spool may be mounted in a variety of ways. I have shown one form which, due to its simplicity, is quite satisfactory. However, to insure a simpler unwinding of the line, it may be desirable to have the stud or second spool mounted at the periphery of the rear flange of the first spool, with its lengthwise axis directed at the first guide on the rod. So long as the second spool or stud is not disposed coaxially with the first spool, the flanges on said members will effectively retain the line during winding operations, and yet permit ready release of the line in the paying out movement of the casting action.

The various windings illustrated in the drawings have been referred to as figure-8 windings, even though certain of them are symmetrical (see Figure 4) while others are modified (see Figures 1 and 7). It will be recognized that so long as a reversal of the windings is employed in each complete winding operation, the objects of the invention will be fulfilled, and whether the resulting figure-8 winding is symmetrical or modified, it comes within the spirit and scope of the present invention.

It will be apparent from an examination of the various modifications disclosed herein that the present invention is susceptible of embodiment in a variety of forms. The drawings illustrate typical embodiments incorporating features of the present invention, and other variations are contemplated. Changes and modifications may be availed of within the spirit and scope of the invention as defined in the hereunto appended claims.

What I claim and desire to secure by Letters Patent is:

1. A reel of the character described, comprising a spool to which a line is attached, means connected with the spool for supporting it on a casting rod, said spool being normally positioned on the rod with its lengthwise axis extending longitudinally of the rod, and a headed member mounted in substantially fixed relation to the spool and at an acute angle to the lengthwise axis of the spool, whereby the line may be wound about said member and the spool in at least a modified figure-8 pattern.

2. A reel of the character described, comprising a spool to which a line is attached, means connected with the spool for supporting it on a casting rod, said spool being normally positioned on the rod with its lengthwise axis extending longitudinally of the rod, and a second spool supported in substantially fixed relation to but distant from said first mentioned spool, about which the line is wound in at least a modified figure-8 pattern.

3. A reel of the character described, comprising a spool to which a line is attached, means connected with the spool for supporting it on a casting rod, said spool being normally positioned on the rod with its lengthwise axis extending longitudinally of the rod, and a headed member mounted in substantially fixed relation to but out of axial alinement with the spool, about which the line is wound in at least a modified figure-8 pattern.

4. A reel of the character described, comprising a spool to which a line is attached, means connected with the spool for pivotally supporting it on a casting rod, said spool being normally positioned on the rod with its lengthwise axis extending longitudinally of the rod, and a headed member mounted in substantially fixed relation to but out of axial alinement with the spool, about which the line is wound, said spool-supporting means being rotatable through 180° to position the lengthwise axis of the spool transversely of the line at opposite sides thereof, whereby the line may be wound about said member and the spool in at least a modified figure-8 pattern.

5. A reel of the character described, comprising a rotatable spool to which a line is attached, means connected with the spool for supporting it on a casting rod, said spool being normally positioned on the rod with its lengthwise axis extending longitudinally of the rod, a crank handle connected with the spool for manual rotation of the spool, and a headed member mounted in substantially fixed relation to but out of axial alinement with the spool, whereby the line may be wound about said member and the spool in at least a modified figure-8 pattern.

6. A reel of the character described, comprising a rotatable spool to which a line is attached, means connected with the spool for supporting it on a casting rod, said spool being normally positioned on the rod with its lengthwise axis extending longitudinally of the rod, a crank handle connected with the spool for manual rotation of the spool, a headed member mounted in substantially fixed relation to but out of axial alinement with the spool, about which the line is wound in at least a modified figure-8 pattern, and a clicking device associated with the spool for audibly indicating the rate of its rotation.

7. The combination with a casting rod having a reel seat, and a series of guides at intervals between said reel seat and its tip, of a reel, inclusive of a spool, means connected with the spool for supporting it from the reel seat, and a headed member mounted in substantially fixed relation to but at an acute angle to the lengthwise axis of the spool, and a line attached to the spool and wound about the headed member and the spool in at least a modified figure-8 pattern, with its free end extending through the guide to the tip of the rod.

8. The combination with a casting rod having a reel seat, and a series of guides at intervals between said reel seat and its tip, of a reel, inclusive of a spool, means connected with the spool for supporting it from the reel seat, and a headed member mounted in substantially fixed relation to but at an acute angle to the lengthwise axis of the spool, a line attached to the spool and wound about the headed member and the spool in at least a modified figure-8 pattern, with its free end extending through the guides to the tip of the rod, and means on the rod between the reel and the tip for snubbing the line.

9. The combination with a casting rod having a reel seat, and a series of guides at intervals between said reel seat and its tip, of a reel, inclusive of a spool, means connected with the spool for pivotally supporting it from the reel seat, and a headed member mounted in substantially fixed relation to the spool and at an acute angle to the lengthwise axis of the spool, said reel being movable about the pivotal mounting to move the spool from a position in which the lengthwise axis of the spool extends longitudinally of the rod during casting to a second position at a right angle to said first position when a line is being wound on the reel, and a line attached to the spool and wound about the headed member and the spool in at least a modified figure-8 pattern, with its free end extending through the guides to the tip of the rod.

10. The combination with a casting rod having a reel seat, and a series of guides at intervals between said reel seat and its tip, of a reel, inclusive of two spaced spools, means connected with said spools for supporting them from the reel seat with their lengthwise axes directed at the first guide beyond the reel seat, and a line attached to one of said spools and wound about both spools in at least a modified figure-8 pattern, with its free end extending through the guides to the tip of the rod.

11. A reel of the character described, comprising a spool to which a line is attached, means fixedly connected with the spool for supporting it on a casting rod with its lengthwise axis extending longitudinally of the rod, said spool having relatively wide front and rear flanges, and a headed stud projecting from the rear flange out of axial alinement with the spool, whereby the line may be wound about the stud and the spool in at least a modified figure-8 pattern.

12. A reel of the character described, comprising a rotatable spool to which a line is attached, means on which the spool is journaled pivotally supporting the spool on a casting rod, said spool having relatively wide front and rear flanges, a headed stud projecting from the rear flange out of axial alinement with the spool, whereby the line may be wound about the stud and the spool in at least a modified figure-8 pattern, and a crank handle extending from the supporting means for rotating the spool.

13. A reel for a casting rod having a plurality of guides for a fishing line, said reel comprising a pair of spools upon which said line may be wound in at least a modified figure-8 pattern; and a support for positioning said spools in substantially fixed relation to each other and with their axes extending in a direction to intersect the first guide.

14. In a reel for a casting rod, a spool upon which a fishing line is wound; a headed member attached to a flange of said spool and extending at an angle to the axis of said spool so that said fishing line may be wound upon said spool and said headed member to reverse the direction of wind of said line at intervals; and a support for said spool for positioning said spool with its axis extending generally in the direction of said rod.

15. A reel for a casting rod as defined in claim 14, wherein said support is constructed and arranged to alternatively position said reel with its axis extending generally in the direction of said rod and generally across said rod.

16. A reel for a casting rod, comprising a spool upon which a fishing rod is wound and provided with a line-retaining flange; a headed member extending angularly from said flange so that said fishing line may be wound upon said spool and said headed member to reverse the direction of wind of said line at intervals, and a support for said spool, adapted to position said spool with its axis extending generally in the direction of said rod.

ORA S. FOWLER.